United States Patent [19]

Carroll et al.

[11] Patent Number: 4,576,974
[45] Date of Patent: Mar. 18, 1986

[54] POLYOL COMPOSITIONS AND POLYURETHANE FOAMS MANUFACTURED THEREFROM

[75] Inventors: William G. Carroll, Vossem; Ian D. Rosbotham, Heverlee, both of Belgium

[73] Assignee: Imperial Chemical Industries, PLC, London, England

[21] Appl. No.: 700,385

[22] Filed: Feb. 11, 1985

[30] Foreign Application Priority Data

Mar. 8, 1984 [GB] United Kingdom ............... 8406050

[51] Int. Cl.$^4$ ...................... C08G 18/14; C08G 18/34
[52] U.S. Cl. ...................................... 521/173; 252/182
[58] Field of Search ......................... 252/182; 521/173

[56] References Cited

U.S. PATENT DOCUMENTS

| | | | |
|---|---|---|---|
| 3,288,732 | 11/1966 | Chapman et al. | 521/173 |
| 3,467,605 | 9/1969 | Abercrombie et al. | 521/173 |
| 3,591,532 | 7/1971 | Abercrombie et al. | 260/215 |
| 4,374,935 | 2/1983 | Decker et al. | 521/173 |
| 4,404,295 | 9/1983 | Bernstein et al. | 521/173 |

FOREIGN PATENT DOCUMENTS 1475541  6/1977  United Kingdom .

*Primary Examiner*—Herbert S. Cockeram
*Attorney, Agent, or Firm*—Cushman, Darby & Cushman

[57] ABSTRACT

A mixture of polyols useful in preparing closed cell rigid foams. The polyols are made by blending a polyester polyol derived from succinic, glutaric and adipic acids and a non-polymeric or polyoxyalkylene polyol having a functionality from 3 to 4. When reacted with an organic polyisocyanates, the resulting rigid polyurethane foams are dimensionally stable and less flammable compared with polyether-based products.

3 Claims, No Drawings

POLYOL COMPOSITIONS AND POLYURETHANE FOAMS MANUFACTURED THEREFROM

This invention relates to polyol compositions and their use in the manufacture of rigid polyurethane foams.

It is known to manufacture polyurethane foams by reacting organic polyisocyanates with organic polyols using blowing agents to generate the gas necessary for the foamed structure. It is also known that by varying the hydroxyl numbers and/or functionality of the polyol, foams can be produced which are either flexible or rigid in character. Thus, polyols suitable for the manufacture of rigid foams might be broadly defined as having more than two hydroxyl groups per molecule and hydroxyl numbers in the range 200 to 800. Whilst this is satisfactory as a broad definition, it is understood by those skilled in the art that, because of the complex physical and chemical interactions which occur during foam formation, the formulation of a reaction mixture which will provide a commercially acceptable rigid foam involves a very careful selection of the materials involved.

In general, the polyols used in rigid foam manufacture are polyethers or polyesters, the selection of one or the other being made on grounds of performance and/or cost. Particularly suitable polyesters from the cost point of view are those derived from commercially available mixtures of succinic, glutaric and adipic acids. The general use of such polyesters in polyurethane foam manufacture has been described in our United Kingdom Patent Specification No. 1475541.

The specific description in the above mentioned patent specification is largely conceived with the preparation of microcellular elastomers from linear polyesters, the only reference to rigid foams being a general statement as to suitable hydroxyl numbers (200 to 800) and degree of branching. Further work has shown that certain branched polyesters derived from the above said acid mixtures and having hydroxyl numbers in the state range provide foams which are substantially rigid in character but do not reach acceptable standards of dimensional stability. In particular, foams made from these polyesters tend to shrink shortly after preparation or in subsequent testing under cold storage conditions. Attempts to overcome this instability by increasing the degree of branching have produced polyesters which are undesirably viscous and less compatible with the fluorocarbons commonly used as blowing agents.

It has now been found that excellent rigid foams can be made when the above said mixed acid polyesters are used together with certain non-polymeric polyols or polyoxyalkylene polyols as defined below.

Accordingly, the invention provides a polyol composition comprising:

(A) a polyester polyol containing residues derived from succinic, glutaric and adipic acids having a hydroxyl number in the range 150 to 450 and 0.5 to 2.0 branch points per 1000 units of molecular weight, and (B) a non-polymeric or polyoxyalkylene polyol having a functionality from 3 to 4 and a hydroxyl number of at least 750, the relative proportions of A and B being such that the composition has a hydroxyl number in the range 400 to 600.

The polyester polyols used in accordance with the invention may be prepared by condensing one or more polyols with a mixture of succinic, glutaric and adipic acids or with a mixture of ester-forming derivatives of said acids, for example a mixture of their dimethyl esters. If desired, other dicarboxylic acids or their ester-forming derivatives, for example phthalic anhydride, may be included in the polyesterification. Particularly useful polyester polyols are those in which the mixture of succinic, glutaric and adipic acids contains from 20 to 30% of succinic acid, from 50 to 70% of glutaric acid and from 15 to 25% of adipic acid on a weight basis.

Polyols which may be used in the manufacture of the polyesters include ethylene glycol, diethylene glycol, propylene glycol, dipropylene glycol, glycerol, trimethylolpropane and pentaerythritol or mixtures thereof, the amount of polyol relative to the amount of acids or acid derivatives being chosen in known manner to give a polyester having the desired hydroxyl numbers and degree of branching.

The polyesterification may be performed using techniques fully described in the prior act, for example the specifications of UK Patent No. 1475541 or UK Patent Application GB 2021602 A.

Non-polymeric polyols which may be present in the polyol compositions of the invention are preferably liquids at normal temperatures. Examples of suitable non-polymeric polyols having functionalities of from 3 to 4 include glycerol and triethanolamine.

Polyoxyalkylene polyols which may be present in the polyol compositions of the invention include products having hydroxyl numbers of at least 750 obtained by reacting propylene oxide and/or ethylene oxide with an initiator having a functionality of from 3 to 4. Suitable initiators include glycerol, trimethylolpropane, pentaerythritol, ammonia, triethanolamines, tolylene diamine, ethylene diamine and mixtures thereof.

The polyol compositions of the invention may be prepared by blending the polyester polyol and the non-polymeric polyol or polyoxyalkylene polyol in conventional manner. In general, the polyoxyalkylene polyols are more compatible with the polyesters than are the non-polymeric polyols. Polyol compositions containing immiscible ingredients must be thoroughly homogenised before being used in foam manufacture.

The polyol compositions may be reacted with organic polyisocyanates in known manner to foam rigid polyurethane foams. Suitable organic polyisocyanates include the known diphenylmethane diisocyanate compositions which contain 4,4'-diphenylmethane diisocyanate, isomers thereof and related polymethylene polyphenyl polyisocyanates of higher functionality. Such compositions commonly contain from 45 to 50% by weight of diisocyanates but compositions containing less than 40% by weight of diisocyanates may advantageously be used. In general, the amount of organic polyisocyanate used relative to the polyol composition and any other isocyanate-reactive ingredients of the reaction mixture should be such as to provide an isocyanate index of from 80 to 150.

In addition to the polyol composition and the polyisocyanate, the foam-forming reaction mixture will contain a blowing agent such as trichlorofluoromethane, optionally with water and may also contain other conventional ingredients of such reaction mixtures such as catalysts and fire-retarding agents. It is often convenient to include all the components of the reaction mixture, other than the polyisocyanate, in the polyol composition before it is reacted with the polyisocyanate.

It has been found that foams made from the polyol compositions of the invention have better dimensional stability than rigid foams made from the polyester polyols alone, that is to say without the non-polymeric or polyoxyalkylene polyol. In this connection, it has been found that polyyoxyalkylene polyols other than those defined herein do not give the same improvement in dimensional stability. In particular, oxypropylated sorbitol and sucrose polyols give improved dimensional stability only when used in amounts large enough to adversely affect the fire resistance of the foams. In regard to the last mentioned property, it has been found that foams made from the polyol compositions of the invention are less flammable than rigid foams made entirely from polyether polyols. This means that lower levels of flame retardant, for example dimethyl methylphosphonate or tris chloropropyl phosphate, can be used to achieve acceptable levels of fire resistance with a consequent reduction in cost and smoke levels.

The invention is illustrated but not limited by the following Example in which all parts and percentages are by weight.

EXAMPLE

Rigid foams were made by combining a diphenylmethane diisocyanate composition, a polyol composition and other ingredients as indicated in the following formulations:

|  | 1 | 2 |
| --- | --- | --- |
| Diphenylmethane diisocyanate composition | 123 | 126 |
| Polyol composition | 100 | 100 |
| Dimethyl methylphosphonate | 8.1 | 8.1 |
| Silicone DC193 | 2.7 | — |
| Silicone B8406 | — | 1.3 |
| Potassium acetate solution | 2.0 | 2.0 |
| Dimethylaminoethanol | 1.1 | 3.0 |
| Trichlorofluoromethane | 44 | 32 |
| Isocyanate index | 105 | 105 |
| % P in polymer | 0.85 | 0.85 |
| Density (kg/m$^3$) | 25 | 31 |
| DIN 4102 B2 flame height (cm) | 10 | 11 |
| End of rise (sec) | 160 | 60 |

The diphenylmethane diisocyanate composition used in the formulations contained approximately 35% of diphenylmethane diisocyanate isomers, the remainder of the composition largely being polymethylene polyphenyl polyisocyanates of functionality greater than two.

The polyol composition used in Formulation 1 consisted of 12.7 parts of glycerol and 87.3 parts of a polyester having a hydroxyl number of 250 and between 0.5 and 2.0 branch points per 1000 units of molecular weight prepared by reacting glycerol and dipropylene glycol with phthalic anhydride and a mixture of the dimethyl esters of succinic, glutaric and adipic acids, the esters being derived from a mixture containing 20 to 30% of succinic acid, 50 to 70% of glutaric acid and 15 to 25% of adipic acid.

The polyol composition used in Formulation 2 consisted of 77.1 parts of the same polyester and 22.9 parts of oxypropylated glycerol having a hydroxyl number of 1120.

The potassium acetate solution contained equal weights of potassium acetate and ethylene glycol with 1% of water.

For comparison, a foam was made frm the same diphenylmethane diisocyanate composition and a polyether based formulation as follows:

| Polyether | 100 |
| --- | --- |
| Dimethyl methylphosphonate | 24.9 |
| Silicone DC193 | 2.8 |
| Potassium acetate solution | 1.2 |
| Trichlorofluoromethane | 55 |
| Diphenylmethane diisocyanate composition | 130 |
| Isocyanate Index | 105 |
| % P in polymer | 2.4 |
| Density (kg/m$^3$) | 26 |
| DIN 4102 B2 flame height (cm) | 14 |
| End of rise (sec) | 200 |

The polyether used in the formulation had a hydroxyl number of 490 and a functionality of 4 and was obtained by oxypropylating a mixture of sucrose and triethanolamine.

The DIN 4102 test shows that the polyether based foam was more flammable than the foams made from the polyol compositions of the invention.

We claim:
1. A polyol composition comprising:
   (A) a polyester polyol containing residues derived from succinic, glutaric and adipic acids having a hydroxyl number in the range 150 to 450 and from 0.5 to 2.0 branch points per 1000 units of molecular weight, and
   (B) a non-polymeric or polyoxyalkylene polyol having a functionality of from 3 to 4 and a hydroxyl number of at least 750, the relative proportions of A and B being such that the composition has a hydroxyl number in the range 400 to 600.

2. A polyol composition according to claim 1 wherein the polyester polyol contains residues derived from an acid mixture containing from 20 to 30% of succinic acid, from 50 to 70% of glutaric acid and from 15 to 25% of adipic acid.

3. A method for the preparation of a rigid polyurethane foam which comprises reacting a polyol composition as defined in claim 1 with an organic polyisocyanate in the presence of a blowing agent.

* * * * *